United States Patent [19]
Giles

[11] Patent Number: 6,115,054
[45] Date of Patent: Sep. 5, 2000

[54] GRAPHICS PROCESSOR EMULATION SYSTEM AND METHOD WITH ADAPTIVE FRAME SKIPPING TO MAINTAIN SYNCHRONIZATION BETWEEN EMULATION TIME AND REAL TIME

[75] Inventor: Aaron S. Giles, Foster City, Calif.

[73] Assignee: Connectix Corporation, San Mateo, Calif.

[21] Appl. No.: 09/222,461

[22] Filed: Dec. 29, 1998

[51] Int. Cl.$^7$ .................................................. G06F 15/00
[52] U.S. Cl. .................... 345/522; 345/509; 395/500.44; 395/500.47
[58] Field of Search .................... 345/501, 502, 345/522, 507–509; 395/500.44, 500.48

[56] References Cited

U.S. PATENT DOCUMENTS

| | | | |
|---|---|---|---|
| 4,903,218 | 2/1990 | Longo et al. ............................ | 345/504 |
| 5,448,263 | 9/1995 | Martin ..................................... | 345/173 |

*Primary Examiner*—Kee M. Tung
*Attorney, Agent, or Firm*—Pennie & Edmonds LLP

[57] ABSTRACT

An emulation system emulates operation of a graphics processor in a target computer system that is executing a computer program. The graphics processor in the target computer system executes graphics commands generated by the program being executed to as to generate a sequence of frames that are to be displayed. The emulation method is performed by an emulation module that is executed by a general purpose computer. The emulation module receives a sequence of graphics commands and stores the graphics commands in a command cache. Upon detecting a frame end, the emulation module executes at least some of the commands in the command cache so as to at least partially render a frame represented by the commands in the command cache and thereby store image data in a video memory (VRAM). At each frame end the emulation module evaluates the ability of the general purpose computer to generate video frames fully synchronized with the target computer system. When the evaluation is positive, the emulation module fully executes all the commands in the command cache so as to fully render the frame; when the evaluation is negative, the emulation module executes a first subset of the commands in the command cache, and skips execution of a second subset of the commands in the command cache, so as to partially render the frame.

12 Claims, 14 Drawing Sheets

GRAPHICS PROCESSOR EMULATION SYSTEM AND METHOD WITH ADAPTIVE FRAME SKIPPING TO MAINTAIN SYNCHRONIZATION BETWEEN EMULATION TIME AND REAL TIME

The present invention relates generally to a system and method for emulating the operation of a graphics processor on a general purpose computer system, and more specifically a system and method for adaptively skipping video frames when the emulation system determines that emulation time is less than the real time of the system.

BACKGROUND OF THE INVENTION

The present invention relates to a system for using a general purpose computer to emulate the operation of a system having a dedicated graphics processor. For instance, there are many brands of video game machines that use various forms of dedicated graphics processors. Content providers (e.g., computer game authors and their employers) write software that is specifically designed to be executed by a particular, customized, computer architecture.

As shown in FIG. 1, video game machines are typically implemented as a special purpose (and often low cost) computer 50 that has a central processing unit (CPU) 52, main memory 54, a graphics processor 55, a video memory subsystem 56, a CD-ROM drive 58, and one or more communication buses 60, 62 for interconnecting those components. The computer 50 typically includes various user input devices, such as a joystick 64, and various output devices, such as a television 66 and one or more audio speakers 68 (which may be incorporated in the television 66, or may be separate from the television). The CPU 52 in many video game machines includes customized, non-standard features not found in typical desktop computers to facilitate the generation of complex, robust games. The main memory 54 may include both high speed random access memory (RAM) as well as read only memory (ROM). The video memory subsystem 56 typically includes a video memory array (VRAM 70) and VRAM logic 72, which provides support for operations such as copying blocks of data from one portion of VRAM to another. The graphics processor 55 and/or the VRAM logic 72 typically support special operations such as filling objects (e.g., triangles and four sided objects) with a fill pattern, drawing objects or portions of objects within a clipping region, handling various three-dimensional graphics functions such as transparency related rendering. The CD-ROM drive 58 receives CD-ROM disks (CD-ROMs) 74, which contain programs and data to be processed by the video game system 50.

The use of specialized hardware, such as the graphics processor 55 shown in FIG. 1, which operates in parallel with the CPU 52, allows content providers to generate complex graphics and games with relatively modest central processor (instruction execution) logic. As a result, when such a system is emulated by a general purpose computer, the computer must execute a much larger number of instructions to emulate all the functions performed by the specialized support logic found in the specialized hardware.

Ideally, the emulation system should operate in a manner that is synchronized with the operation of the system being emulated. In other words, the game or other program when executed by the emulation system should not progress either faster or slower than the same program when executed by the dedicated graphics processing system. More specifically, the emulation system should ideally generate exactly the same video frames at exactly the same rate as the emulated system. However, unless the emulation system is extremely powerful, this ideal performance goal will be unattainable, at least for those video frames that are generated using long and complex (or at least processing intensive) sequences of rendering commands. Some video frames require much more processing than others to render the respective frame images.

Also, some of the computers on which an emulation system is implemented will be less powerful than others. A relatively low power computer executing the emulation system might be able to render, say, only half as many frames per second as the video game system being emulated, while a more powerful computer might be able to keep up with the emulated system for all but the most complex frames.

It is a goal of the present invention to provide an emulation module that can be executed on a variety of general purpose computer systems and that faithfully emulates a target video game system to best of the ability of the computer system on which it is being executed. In other words, it is goal of the present invention to provide an emulation module that, without having any special information about the computer system on which it is operating, automatically adapts itself so as to emulate the execution of any particular program (e.g., video game program) as faithfully as possible. The emulation module should generate video frames that are the same, or very close to the same as those generated by the target system, and should do so in manner that is closely synchronized with the target system.

Another goal of the present invention is to provide a graphics processor emulator, or emulation module, that adaptively skips video frames (i.e., avoids rendering skipped video frames) so as to keep the emulation system synchronized with the target system, while taking measures to minimize errors in rendered frames caused by the skipping of other frames.

SUMMARY OF THE INVENTION

In summary, the present invention is an emulation system and a method of emulating operation of a graphics processor in a target computer system. The emulation method emulates operation of a graphics processor in a target computer system that is executing a computer program. The graphics processor in the target computer system executes graphics commands generated by the program being executed to as to generate a sequence of frames that are to be displayed. Each frame is rendered in a video memory by executing a corresponding set of graphics commands.

The emulation method is performed by an emulation module that is executed by a general purpose computer. The emulation module receives a sequence of graphics commands and stores the graphics commands in a command cache. Upon detecting a frame end, the emulation module executes at least some of the commands in the command cache so as to at least partially render a frame represented by the commands in the command cache and thereby store image data in a video memory (VRAM). At each frame end the emulation module evaluates the ability of the general purpose computer to generate video frames fully synchronized with the target computer system. When the evaluation is positive, the emulation module fully executes all the commands in the command cache so as to fully render the frame; when the evaluation is negative, the emulation module executes a first subset of the commands in the command cache, and skips execution of a second subset of the commands in the command cache, so as to partially render the frame.

Since the ability of the general purpose computer to keep up with the target computer system is re-evaluated at each frame end, some frames are fully rendered while other frames are partially rendered. This evaluation is accomplished by comparing a current time value with an emulation time value to determine if the emulation is generating frames more slowly than the target computer system.

The commands stored in the command cache include drawing commands for drawing objects in the VRAM. For each frame, the evaluation module determines whether a total rendering area associated with all drawing commands for the frame exceed an image area (also called the screen area) associated with each frame. When the determination is that the total rendering area does not exceed the image area, a Sparse Mode of operation is selected. When the determination for at least N successive frames is that the total rendering area does exceed the image area, a Full Mode of operation is selected, where N is an integer greater than one.

When the Sparse Mode of operation is selected, all frames are fully rendered. When Full Mode is selected, a current time value is compared with an emulation time value to determine if the general purpose computer system is generating video frames more slowly than the target computer system. When the comparison has a first result, a frame is fully rendered, and otherwise the frame is partially rendered.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Theory of Operation

Figure 1:
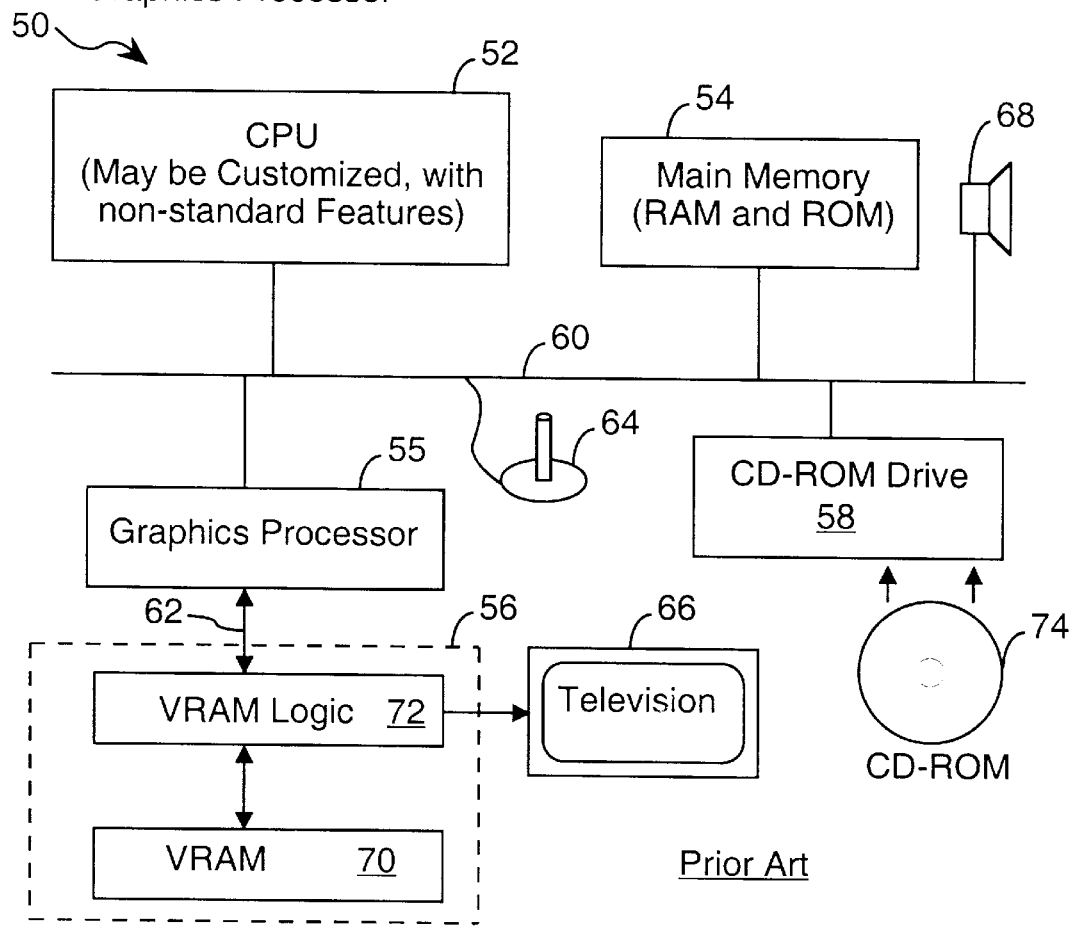
FIG. 1 is a block diagram of the elements of a typical video game system relevant to discussion of the present invention.

The present invention keeps an emulation system closely synchronized with a target system as the emulation system emulates operation of the target system that is executing a video game program (or any other program that generates complex graphics images, such as three dimensional images). The emulation system executes the same video game program that would normally be executed by the target system, and keeps track of the clock time in the emulated target system (called the emulation time) upon completion of each command in the video game program. The emulation system compares the emulation time with the "real time" as determined by a clock in the emulation system. If real time does not exceed emulation time, the emulation system is keeping up with the target system and all video frames generated by the video game program are fully rendered and displayed.

Whenever real time exceeds the emulation time, that indicates that the emulation system is taking longer to generate new frames than the target system. This condition is called "falling behind the target system." To maintain tight synchronization with the target system, the emulation system "skips" the rendering of one or more video frames until the real time of the emulation system no longer exceeds the emulation time. However, it should be understood that "skipping" a frame does not mean totally bypassing generation of the skipped frame. Totally bypassing a frame would often cause subsequent frames to be incorrectly generated, since many video frames are based in large part on the content of the immediately previous frame.

In the present invention, all the graphics commands of a skipped frame are executed, except for "clipped" drawing commands for which the clipping window is inside the current framebuffer. The execution of clipped drawing commands typically occupies 80 or 90 percent of the rendering time of an average video frame in a video game, and skipping most of those commands greatly speeds up rendering the frame, while minimizing unintended collateral effects on subsequent frames.

Furthermore, the present invention uses two modes of operation to guide operation of the emulation system. A mode called Sparse Mode is used when the video game program generates frames containing objects whose total area is less than the total image area to be displayed. More specifically, when the total area of the objects used to generate at least one of every four frames is less than the total image area, the graphics processor emulator is placed in Sparse Mode. If the total area of the objects used to generate at least N (e.g., three or four) consecutive frames is more than the total image area, the graphics processor emulator is placed in Full Mode.

In Sparse Mode, all frames are fully rendered, which means that all graphics commands generated by the video game program are executed and the VRAM is fully updated for every frame. However, if the emulator is falling behind the target system, some frames are not displayed. Copying the framebuffer to the display device takes time that can be saved by skipping the displaying of some frames.

In Full Mode, whenever the emulator has fallen behind the target system, a frame is skipped, meaning that it is partially rendered. No more than MaxSkip (e.g., 4 or 5) consecutive frames can be skipped, and thus even if the emulator continues to fall behind the target system, at least one of every five or so frames is fully rendered and displayed. However, in most implementations it is unusual for the emulator to skip more than one or two frames in a row, unless the emulator is being executed by an unsuitably underpowered computer.

Framebuffers

Figure 2:
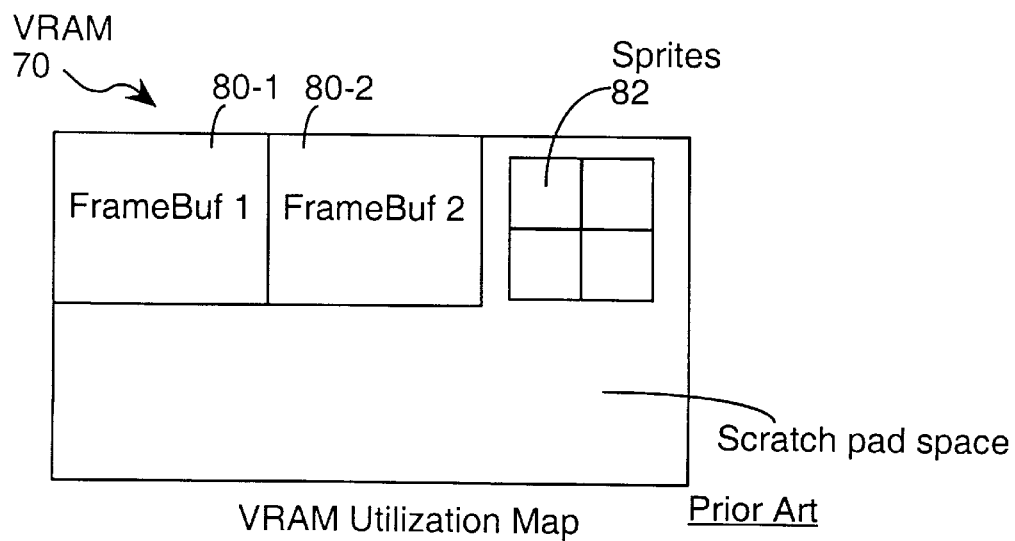
FIG. 2 is a memory map of a video memory array.

Referring to FIG. 2, there is shown a utilization map for a VRAM (video random access memory). VRAM 70 is the memory in which video frames are rendered. A framebuffer 80 is an array of memory that contains one frame (or one screen) of video data. Typically, at least two framebuffers 80 are allocated within the VRAM so that the program being executed can write new images into one framebuffer while the other framebuffer is being displayed. Thus, the program could alternate between two framebuffers, alternately writing to one framebuffer and then the other during successive frame periods.

In a typical video game system, the allocation of framebuffers within the VRAM is not fixed, but rather is determined by each particular video game program. Thus, some game programs might allocate three or more framebuffers within the VRAM, while other game programs might use just two. For ease of explanation, we will assume that a game is using just two framebuffers 80, but nothing in the present invention actually depends on that assumption.

The size of each framebuffer 80 depends on the resolution of the image being generated. Higher resolutions require larger framebuffers than lower resolutions. Thus, the portion of the VRAM occupied by the framebuffers will vary in accordance with the resolution selected by the program author as well as by the number of framebuffers allocated.

In addition to framebuffers, the VRAM 70 is used to store sprites 82, which are rectangular arrays of data, typically representing a particular image, that can copied into a framebuffer while rendering an image. Other portions of the VRAM 70 can be used to store fill patterns, color tiles, miscellaneous images, and anything else a video game author may want to have the game copy (during execution) into a framebuffer while rendering an image.

Emulation System Architecture

Figure 3:
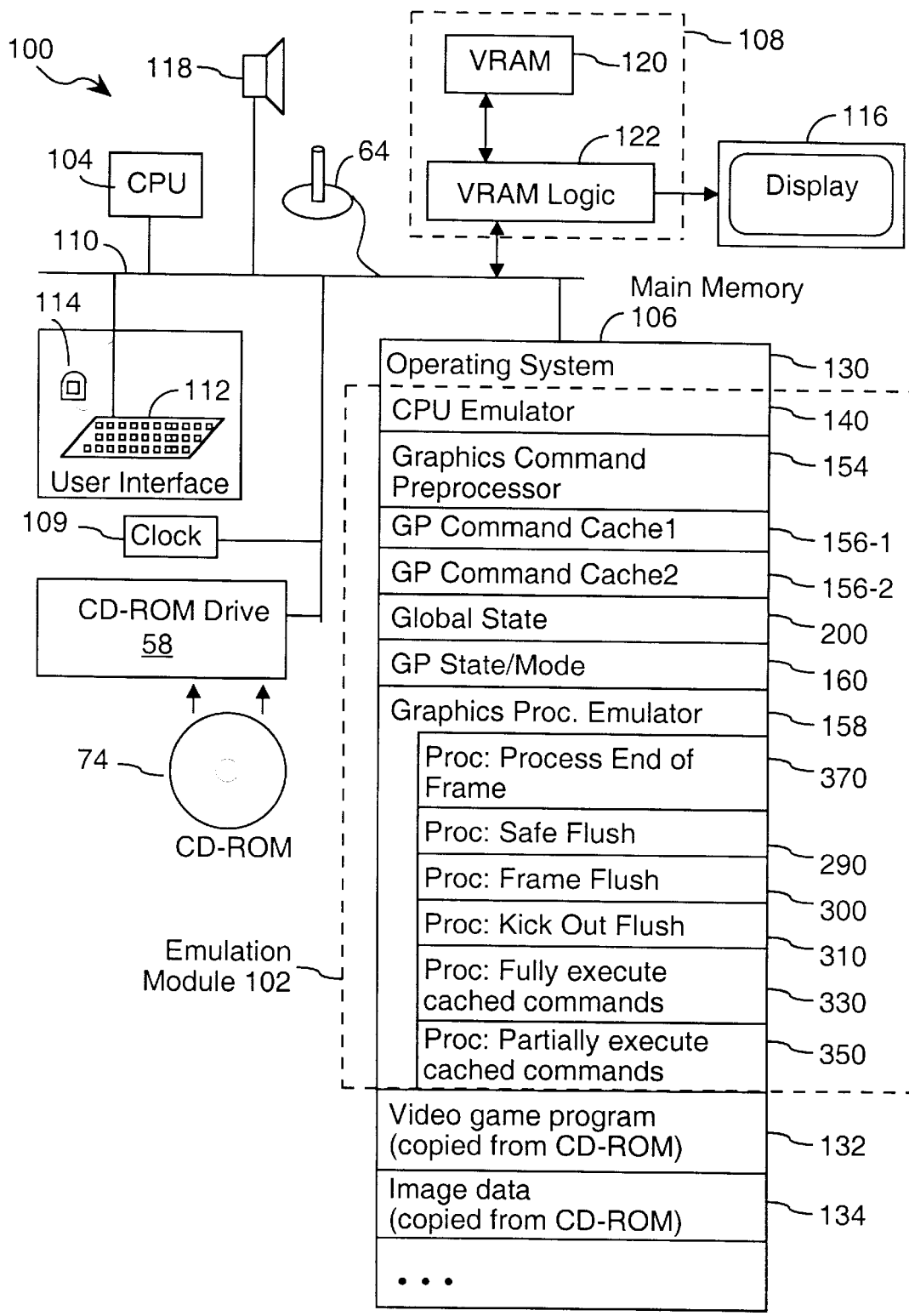
FIG. 3 is a block diagram of a general purpose computer system on which an embodiment of the present invention has been implemented.

Referring to FIG. 3, the present invention is typically implemented as an emulation module 102 that is installed on and executed by a general purpose computer 100. For instance, without limitation, the general purpose computer may be a Macintosh computer, using a G3 microprocessor as its CPU 104, or it may be an IBM compatible computer using a Pentium II microprocessor. The present invention can be implemented using virtually any general purpose computer.

The computer 100 typically includes a central processing unit (CPU) 104, main memory 106, a video memory subsystem 108, a CD-ROM drive 58, a clock circuit 109 and one or more communication buses 110 for interconnecting those components. The computer 100 typically includes various user input devices, such as a joystick 64, keyboard 112 and mouse 114, and various output devices, such as video monitor 116 and one or more audio speakers 118. The main memory 106 may include both high speed random access memory (RAM) as well as non-volatile storage, such as magnetic disk and read only memory (ROM) devices. The video memory subsystem 108 typically includes a video memory array (VRAM 120) and VRAM logic 122, which provides support for operations such as copying blocks of data from one portion of VRAM to another. The CD-ROM drive 58 receives CD-ROM disks (CD-ROMs) 74, which contain programs and data to be processed by the computer system 100.

Main memory 106 may store an operating system 130, for performing basic system operations such as handling input signals from the joystick 64, and for moving programs and data from the CD-ROM drive 58 to main memory 106. Main memory 106 may also store the emulation module 102 that is the subject of the present invention, as well as one or more programs 132 copied from the CD-ROM 74 and video data 134 copied from the CD-ROM 74. The various programs and data structures in the emulation module 102 will be discussed below.

Figure 4:
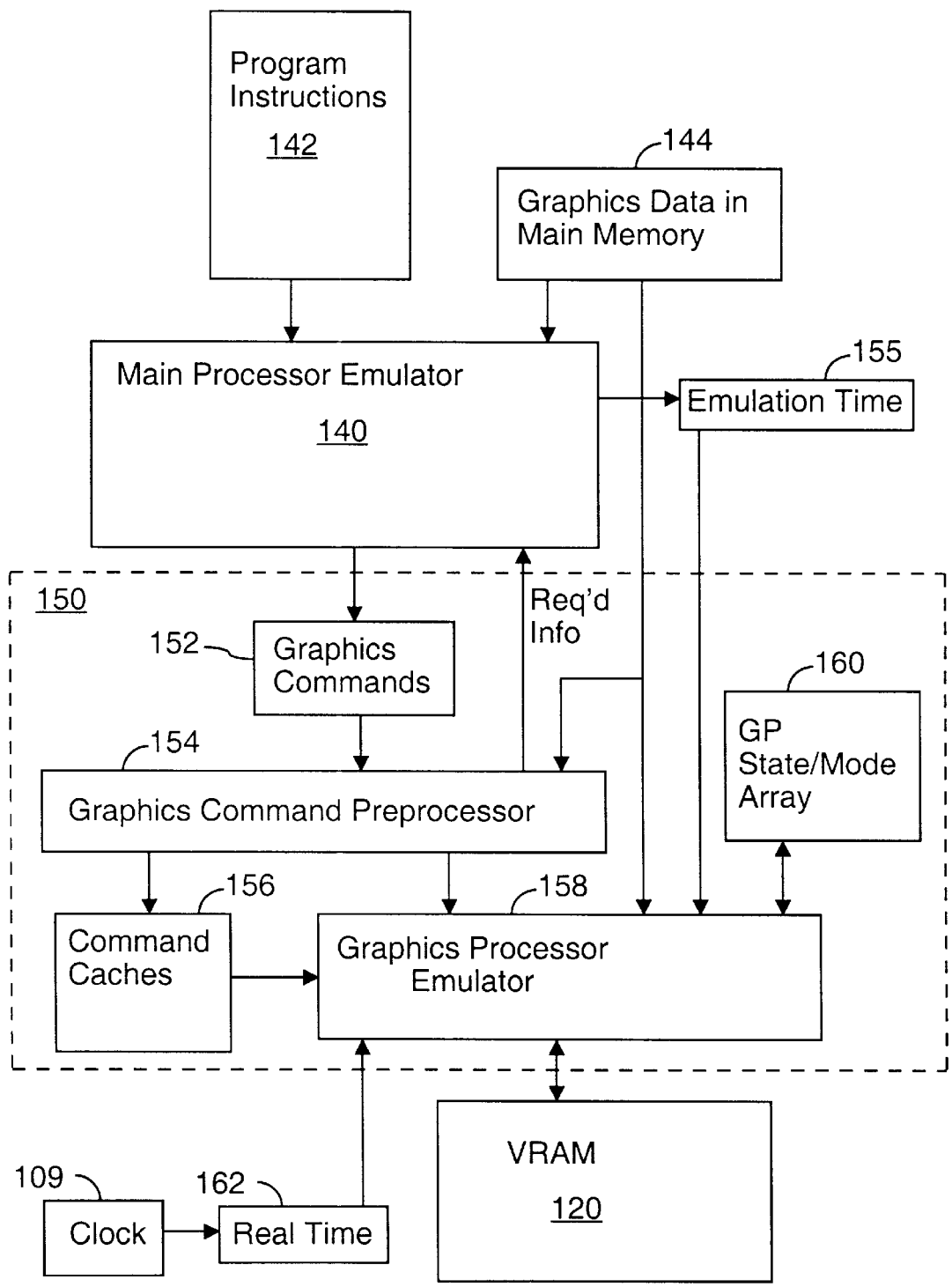
FIG. 4 is a conceptual control flow diagram for an embodiment of the present invention has been implemented.

Referring to FIG. 4, the emulation module includes a main processor emulator 140, which emulates operation of the target system's CPU. Thus, the emulator 140 emulates execution of the same stream of program instructions 142 that would be executed by the target system, and also processes the same graphics data that would be processed by the target system. The main processor emulator 140 is not the subject of the present invention. Systems for emulating the main processor of another computer are well known, and are not the subject of this document. Only those aspects of the main processor emulator 140 relevant to operation of the graphics system emulator 150 are discussed in this document.

One of the primary "results" produced by the main processor emulator 140 is a sequence of graphics commands 152 that in the target system would be sent to the graphics processor. In the graphics system emulator 150, all graphics commands 152 are intercepted and processed by a graphics command preprocessor 154. Most graphics commands are stored by the preprocessor 154 in a command cache 156, but some commands are executed by the preprocessor and then discarded. In particular, graphics commands requesting state information about the graphics processor, and graphics commands requesting graphics data to be downloaded from VRAM to main memory are processed immediately by the preprocessor 154 and then discarded. The requested state information of graphics data is returned to the main processor emulator 140 for use by the program being executed.

Another "result" produced by the main processor emulator 142 is audio data that is sent to an audio subsystem (not shown) for generating music and other sounds.

In addition, the processor emulator 142 generates a time value 155 herein called "emulation time," which is the amount of time that would elapse in the target system due to execution of program instructions. More specifically, the main processor emulator 140 determines the number of CPU cycles that it would take the target system to execute each and every instruction in the instruction stream that is being executed by the main processor emulator 140, and adds that number to a running total so as to keep track of the current "emulation time" at each point during execution of the program. For most instructions, the number of CPU cycles required for execution is fixed, and thus the corresponding time increment is added to the emulation time when each such instruction is executed by the emulator. For instructions whose execution time depends on external events, such as the completion of a DMA data transfer from CD-ROM to main memory, the main processor emulator 140 assumes that the actual execution time by the emulation system is the same as the execution time on the target system, and therefore for those instructions it increments "emulation time" by the actual execution time of those instructions.

As discussed below, emulation time is compared with the "real time" (i.e., clock time) 162 of the computer on which the emulation module is executing, and that comparison is used to determine when to skip or partially skip the rendering of video frames.

When all the commands needed to render a complete frame have been accumulated in the command cache 156, the graphics processor emulator (GP emulator) 158 either executes the graphics commands in the cache so as to render the image in the VRAM 120, or partially executes the accumulated commands, depending on whether or not the emulation system is falling behind the target system, as determined by comparing the current emulation time with the current "real time" of the emulation system.

Command Caches and Other Data Structures

Figure 5:
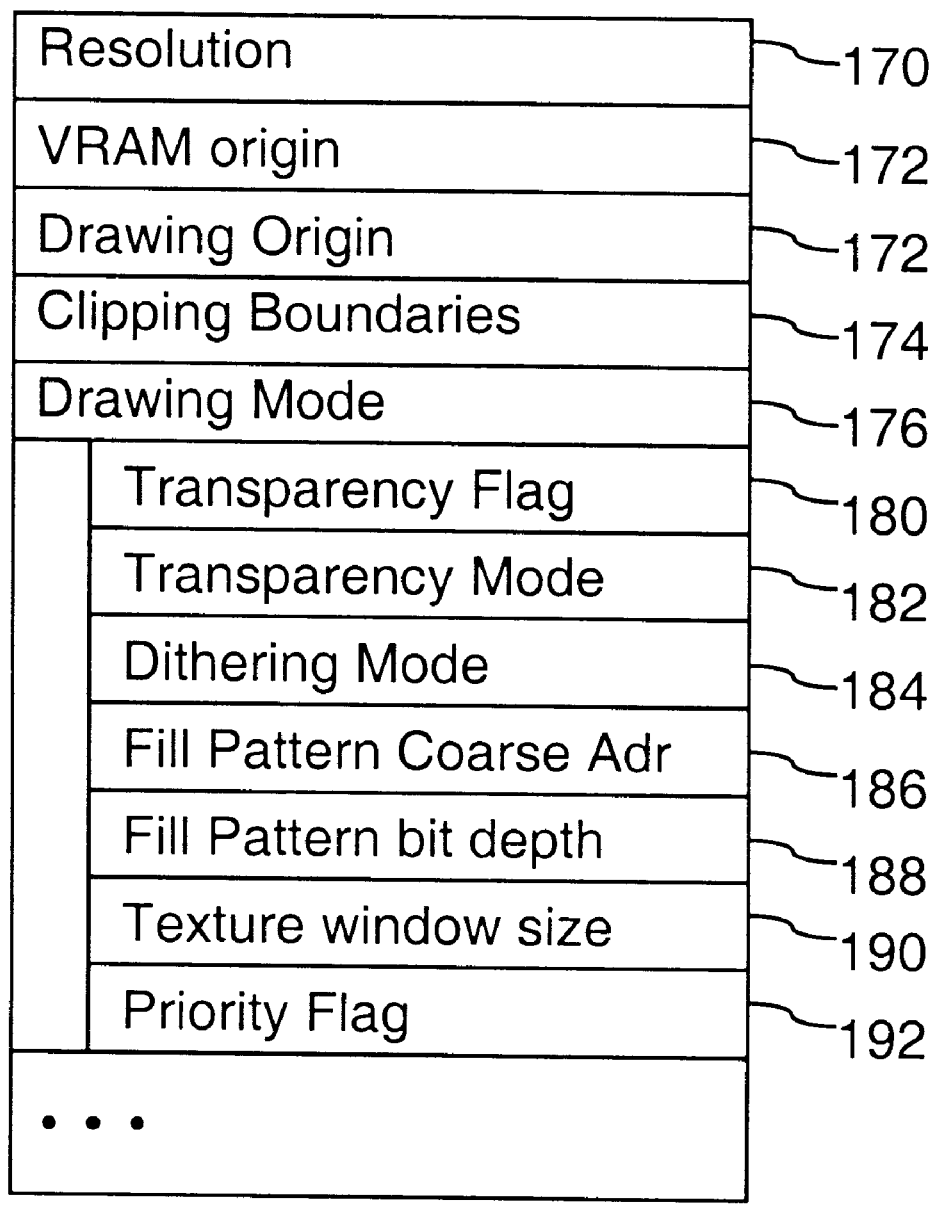
FIG. 5 depicts a graphics processor state/mode array used to keep track of an emulated graphics processor.

Referring to FIGS. 4 and 5, some of the graphics commands executed by the GP emulator 158 may directly or indirectly change the state of the emulated graphics processor, and the GP emulator 158 keeps track of the current state of the emulated graphics processor by storing state and mode information in an array called the GP state/mode array 160. In a preferred embodiment, the GP state/mode array 160 contains the following information:

resolution 170 indicates the width and height of the image in pixels, where higher numbers of pixels indicate higher resolution;

VRAM origin 172, which together with the resolution parameters indicates the portion of VRAM from which to generate a current image on the system's display;

drawing origin 174 indicates the origin of the framebuffer in which the next frame is to be rendered; addresses used in some graphics commands (e.g., Clipped Drawing commands) are defined as being relative to the drawing origin;

clipping boundaries 176 define a rectangular region in which clipped graphics commands are rendered; if an object specified by a clipped graphics command falls outside the clipping boundaries the object is not rendered, and if a portion of an object specified by a clipped graphics command falls outside the clipping boundaries, the portion of the object outside the clipping boundaries is not rendered while the portion that is inside the clipping boundaries is rendered;

drawing mode 176 is a set of parameters that affect rendering.

The drawing mode parameters 176 in one embodiment include:

a transparency flag 180, indicating if transparency handling is enabled;

a transparency mode 182, indicating how transparency is to be handled;

a dithering mode 184;

a fill pattern coarse address 186, which indicates where in the VRAM fill patterns are stored; a "fine address" in certain graphics commands indicates which fill pattern to use;

a fill pattern bit depth 188, which indicates the number of bits of graphics data used to represent each pixel of a fill pattern;

a texture window size 190, which indicates the length and height of each of a texture window, specified as a number of pixels; and a priority flag 192.

The exact set of drawing mode parameters 176, and the definition of those parameters, is entirely dependent on the particular graphics processor whose operation is being emulated. The set of drawing mode parameters 176 mentioned above is not intended to be exhaustive and is not intended to teach the operation of such graphics processors, which is well known to those skilled in the art of writing programs for systems that use such graphics processors.

An "initial snapshot" 220 (FIG. 6) of the state of the emulated graphics processor is stored in the command cache 156 before any of the graphics commands for a frame are processed. The graphic command preprocessor 154 uses the GP state/mode array 160 to keep track of all graphics processor state changes caused by the graphics commands for each frame. The preprocessor generates a "final snapshot" 222 (FIG. 6) of the state of the emulated graphics processor at the end of each frame, by copying the GP state/mode array into the final snapshot field 222 of the current command cache.

Thus, in a preferred embodiment, there are five instances of the GP state/mode array 160, one for keeping track of the current emulated graphics processors state, plus initial and final snapshots of the GP state that are stored in the two command caches 156 (see FIG. 6 and discussion below).

Figure 6:
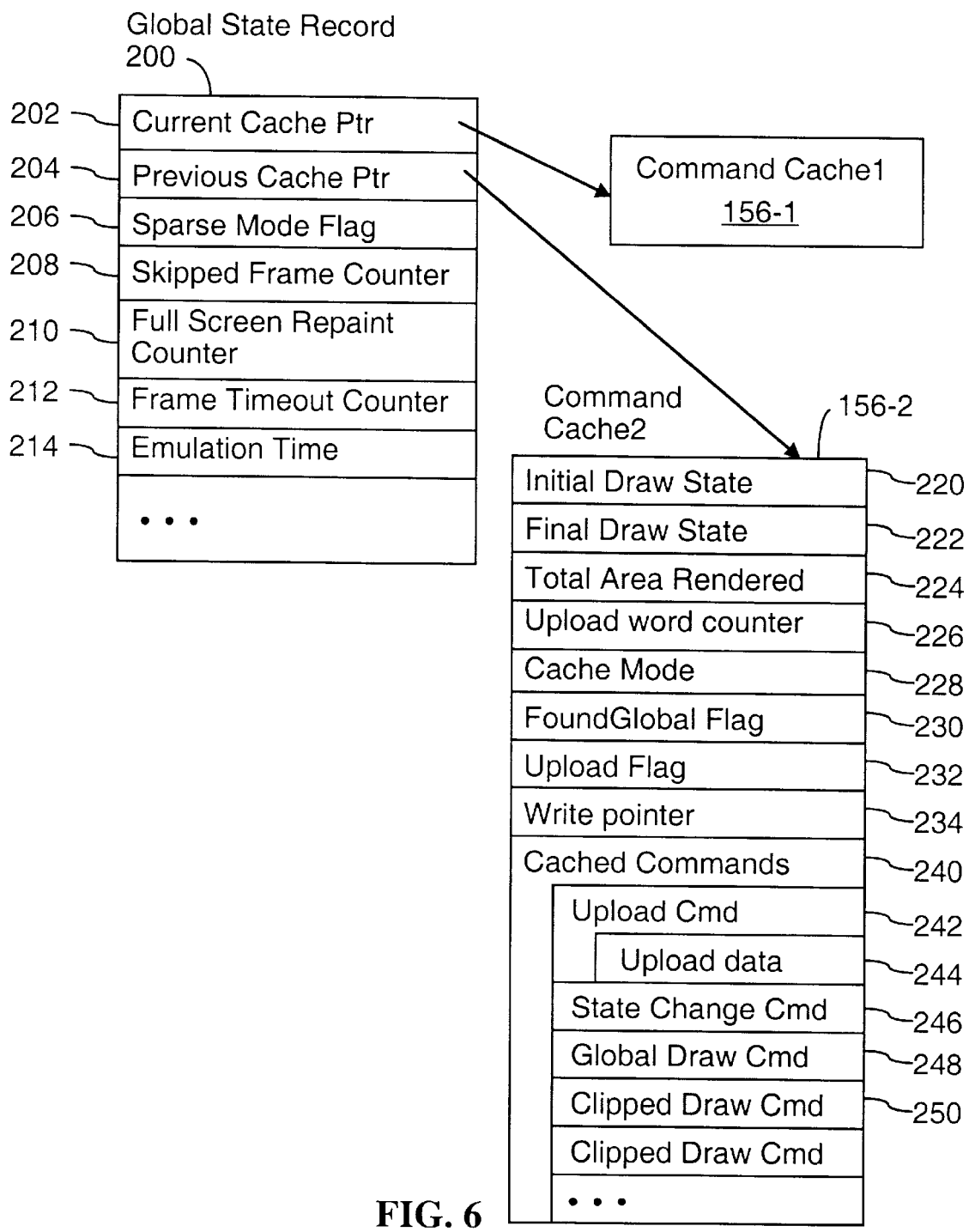
FIG. 6 depicts a global state array and two command caches used to store graphics commands.

Referring to FIG. 6, the graphics processor emulator 158 and the graphics command preprocessor 154 maintain a global state record 200 for keeping track of the state of the graphics emulation subsystem 150 (FIG. 4). The graphics emulation subsystem 150 also uses two command caches 156-1, 156-2: one is used to store the graphics commands for the frame that is currently being generated by the video game program being executed, while a second one is used to store the graphics commands for the previous frame. As explained below, some graphics commands are not stored in the current command cache 156 because they are processed by the graphics command preprocessor and discarded.

In one embodiment, the global state record 200 includes the following parameters:

a current and previous cache pointers 202, 204, for pointing to the two command caches 156-1 and 156-2; whenever the graphics processor emulator determines that it is time to swap command caches, these two pointers are swapped;

a Sparse Mode flag 206, which is set to True when the emulator is in "Sparse Mode" and is set to False when it is in Full Mode; in Sparse Mode the emulator renders all frames in the VRAM, while in Full Mode some frames may be skipped, which means that they are only partially rendered in VRAM;

a Skipped Frame Counter 208, which is used to count how many consecutive frames have been skipped;

a Full Screen Repaint Counter 210, which is used in Sparse Mode to count how many consecutive frames have been included objects whose total area exceeds the screen area;

a Frame Timeout Counter 212, which is used to ensure that the current frame is rendered and sent to the display even if the target system being emulated has stalled for several frame times, for example while downloading data from CD-ROM; and an Emulation Time parameter 214, which is the emulation time value 155 generated by the main processor emulator 140 to keep track of the current emulation time, which is the clock time in the target system.

Each command cache 156 includes the following fields:

an Initial Draw State 220, which is an initial snapshot of the graphics processor state; this snapshot is generated by the graphics processor emulator whenever a new frame is started;

a Final Draw State 222, which is a final snapshot of the graphics processor state; this final snapshot is generated by the graphics preprocessor by preprocessing all graphics commands that affect the graphics processor state of the target system for the frame whose commands are stored in this command cache;

Total Area Rendered 224, which is an approximation of the total area of all the objects to be rendered in the frame whose commands are stored in this command cache;

Upload word counter 226, which is used by the graphics command preprocessor as a down counter for keeping track of the amount of upload data that has yet to be stored in the command cache in order to complete an upload command;

Cache mode 228, which is set to Empty, Active, or Skipped, to indicate the status of the commands stored in the cache;

FoundGlobal Flag 230, which is set to True if the graphics command preprocessor stores any Global Drawing commands in this command cache;

Write pointer 232, which indicates the location in the cache at which the next graphics command word is to be written; and cached commands 240, which are the graphics commands stored in the cache.

For purposes of explaining the operation of the present invention, the graphics commands stored in the cache have been divided into four categories:

upload commands 242, which are used for copying blocks of data from main memory to VRAM; each upload command is followed by the actual graphics data 244 to be stored in VRAM;

state change commands 246, which change the state of the target system's graphics processor, and thus change the value of one or more of the fields in the GP state record 160 when executed by the emulation system;

global draw commands 248, which are used to copy blocks of data from one portion of VRAM to another, and also to fill in a specified region of VRAM with a specified solid-color; and clipped draw commands 250, which are used to draw lines, triangles, four sided objects, and the like, all within the currently established clipping window.

In a preferred embodiment, two classes of commands, state read commands, for retrieving graphics processor state information, and download commands, for downloading data from VRAM to main memory, are not stored in the command cache 156; rather, these commands are executed immediately by the graphics command preprocessor 154 (FIG. 4). In addition, as explained below, some upload commands are not stored in the command cache 156.

Graphics Command Preprocessor

Figure 7A:
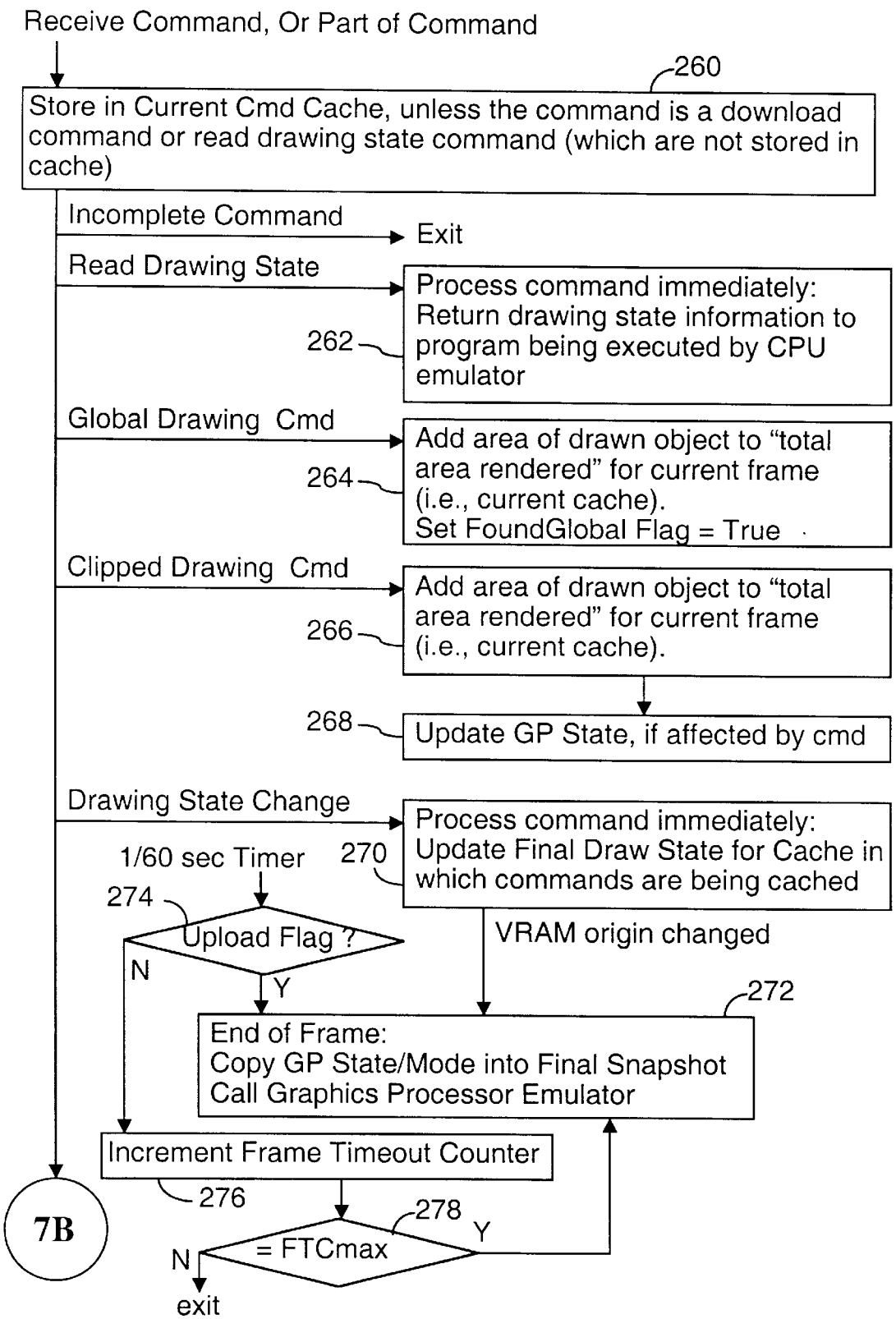
FIGS. 7A and 7B depict a flow chart of the operation of a graphics command preprocessor.
Figure 7B:
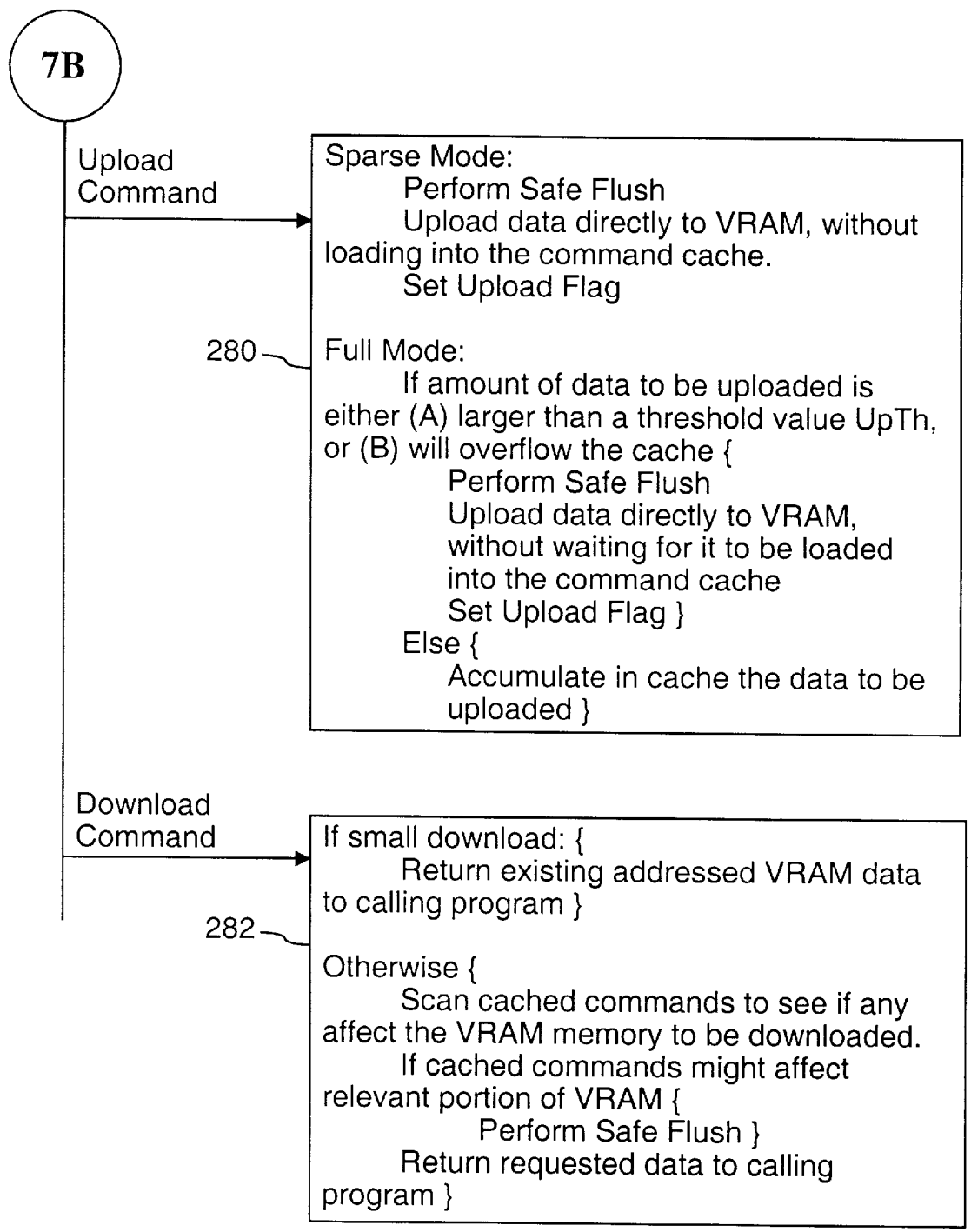

The graphics command preprocessor receives all graphics commands issued by the main processor emulator 140 (FIG. 4). Referring to FIGS. 7A and 7B, the preprocessor stores most graphics commands in the current command cache (260). However, Read Drawing State and Download commands are not stored in the command cache, because they are executed immediately by the graphics command preprocessor and there is no reason to execute them a second time. The results generated by these commands are returned to the calling program (i.e., the video game program being executed by the main processor emulator). As discussed below, some upload commands are executed immediately, and not stored in the command cache.

For purposes of explaining the operation of the preprocessor, the set of all graphics commands has been divided into six groups: Read Drawing State commands, Global Drawing commands, Clipped Drawing commands, Drawing State Change commands, Upload commands and Download commands.

Incomplete Command

If a portion of a graphics command is received, and the command is incomplete, the command portion is stored in the current command cache.

Read Drawing State Command

Each Read Drawing State command received from the graphics command preprocessor requests status information about the graphics processor. The preprocessor responds by immediately returning the requested state information to the main a processor emulator (and thus returns the requested information to the program being executed by the main processor emulator) (262). The Read Drawing State command is not stored in the command cache.

Global Drawing Command

Each Global Drawing command is processed by determining the "area rendered" by the command (e.g., measured in terms of the number of pixels rendered), and adding that number to the Total Area Rendered for the current frame (i.e., the current command cache) (264). Each Global Drawing command is stored in the current command cache. Also, a cache status flag called the FoundGlobal Flag 230 is set to True by the preprocessor whenever at least one Global Drawing Command is found in the current frame (264).

Clipped Drawing Command

Each Clipped Drawing command is processed by determining the "area rendered" by the command (e.g., measured in terms of the number of pixels rendered), without taking the clipping window into account, and adding that number to the Total Area Rendered for the current frame (i.e., the current command cache) (266). Each Clipped Drawing command is stored in the current command cache. In addition, if the Clipped Drawing command modifies the state of the graphics processor in the target system, that current GP state/mode array is changed to reflect that change (268).

Drawing State Change Command

Each Drawing State Change command received from the graphics command preprocessor is stored in the current command cache and is processed by the graphics command preprocessor by making the appropriate change to the current GP State/Mode array (270). If the Drawing State Change command changes the VRAM origin to point to a different framebuffer than the one previously pointed to, this identifies the end of the current frame. Whenever the preprocessor identifies a frame end, it copies the current GP State/Mode array 160 into the Final Snapshot 222 for the current command cache, and then it calls the graphics processor emulator to process the graphics commands stored in the current command cache (272). The Drawing State Change command that modifies the VRAM origin is stored in the current command cache before the graphics processor emulator is called.

There are two additional methods for identifying the end of a frame. The main processor emulator, in addition to keeping track of emulation time, also generates a "frame end" signal each time ⅟60 second of emulation time elapses, because this marks the time at which a frame is likely to end. The frame end signal may be implemented as an interrupt signal, or as a special procedure call to the graphics command preprocessor, or in any of a number of other ways known to those skilled in the art. In a preferred embodiment, the frame end signal is implemented as a procedure call to the graphics command preprocessor.

As just indicated, the frame end signal is generated 60 times per second, which is also the maximum rate at which most video game systems generate new frames, because they output images to a television, and in the United States alternating halves of the television screen's horizontal scan lines are repainted 60 times a second. The occurrence of an Upload command that loads a large amount of data indicates that a large portion of the current framebuffer has probably been over-written, which indicates that the target video game system probably generated a new frame during the current 1/60th second time period.

When the frame end signal is received by the graphics command preprocessor, it checks the Upload Flag for the current command cache (274). If the Upload Flag is set (274-Y), the frame end signal is treated as marking the end of a frame, the Final Snapshot of the GP State/Mode is stored in the command cache, and the graphics processor emulator is called to process the graphics commands stored in the current command cache (272).

If the Upload Flag is not set (274-N) when an frame end interrupt occurs, the Frame Timeout Counter is incremented (276). If Frame Timeout Counter is equal to a predefined maximum value FTCmax (e.g., 5) (278-Y), a frame end is forced and the graphics processor emulator is called to process the graphics commands stored in the current command cache (272). The reason for this is to make sure that the display is always updated at least N (e.g., 12) times per second, even if no frame ends have been detected. For instance, some programs might write new image data directly into the same framebuffer that is being displayed. While this would be unusual, the emulation system is designed to be compatible with a wide variety of video game programming techniques.

Upload Command

The processing of upload commands by the preprocessor depends on the size of the upload and also the current mode (Sparse or Full) of the graphics system emulator (280). If the emulator is in Sparse mode, a Safe Flush is performed (explained below with reference to FIG. 8A), which processes all commands previously stored in the command cache for both the current frame as well as the previous frame. Then the data specified by the Upload command is written directly from main memory into the VRAM, and the Upload flag is set to True. Then the Upload command is discarded, since it has been fully processed.

If the preprocessor is in Full Mode, but the amount of data to be uploaded (A) is larger than a threshold value (e.g., one fourth the size of the command cache), or (B) would overflow the remaining room in the current command cache, then a Safe Flush is performed, the data specified by the Upload command is written directly from main memory into the VRAM, and the Upload flag is set to True. Then the Upload command is discarded, since it has been fully processed.

If the preprocessor is in Full Mode, but the amount of data to be uploaded is not enough to trigger a Safe Flush, then the data to be uploaded is accumulated (i.e., stored) in the current command cache. Thus, in this case the Upload command is stored in the command cache for processing by the graphics processor emulator.

Download Command

Download commands are processed immediately by the preprocessor by immediately returning the data stored in a portion of the VRAM specified by the Download command (282). The Download command is then discarded since it has been fully processes.

More specifically, if the amount of data requested by the Download command is very small (e.g., one or two pixels), the preprocessor simply returns the addressed VRAM data, even though that data may have been modified by commands stored in the command cache. This technique is based on the observation that small downloads are almost always used by video game programs to determine the state of the VRAM outside the current frame.

If the amount of data requested by the Download command is not small, the commands stored in the command cache are scanned to see if any would affect the portion of the VRAM to be downloaded into main memory. If so, a Safe Flush is performed, which causes all the commands currently stored in the command cache to be executed, which updates the contents of the VRAM to take into account all commands that precede the Download command. Finally, the requested data is copied from the VRAM to main memory and the download command is discarded. In other embodiments, this second method of handling Download commands could be used for all Download commands. If no commands stored in the command cache affect portion of VRAM to be downloaded, then no changes are made to the VRAM before the specified VRAM portion is copied to main memory.

Command Cache Flush Methods

The graphics processor emulator has three different methods of processing the commands stored in the previous and current command caches. A Safe Flush executes all commands in the previous command cache as well as all commands in the current command cache. However, if the previous command cache was previously executed (either fully or partially), it is not processed again. Thus, the previous frame is fully rendered if it has not been previously rendered, and the current frame is fully rendered in any case.

Figure 8A:
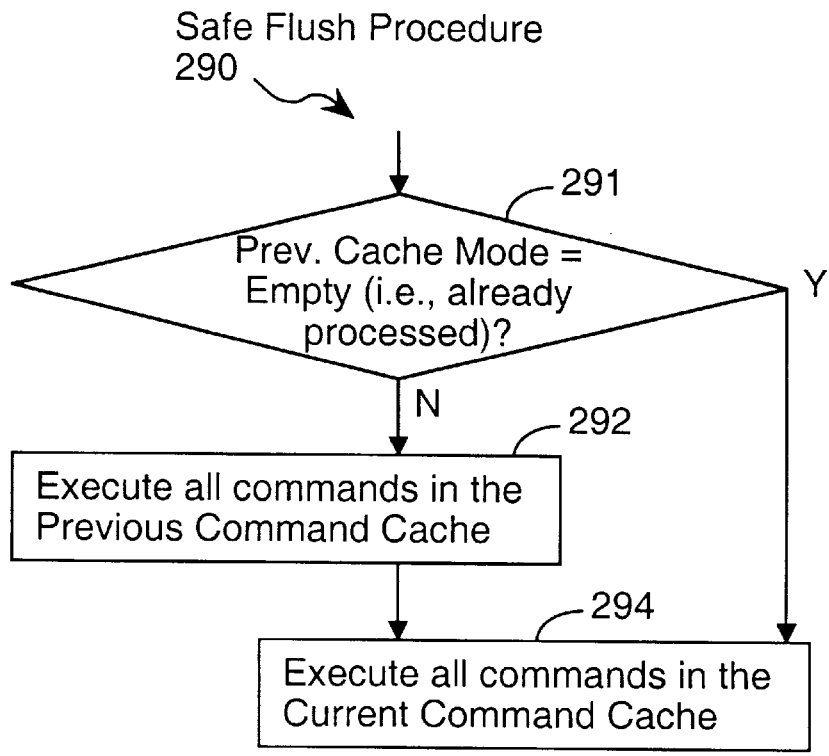
FIGS. 8A, 8B and 8C depict flow charts of Safe Flush, Frame Flush and Kick Out Flush procedures, which are part of a graphics processor emulation module.

More specifically, referring to FIG. 8A, the Safe Flush procedure checks whether the Cache Mode from the previous command cache is Empty (indicating that the previous frame was fully or partially rendered and the commands in the previous command cache were fully or partially processed) (290). If not (290-N), the previous frame is fully rendered by executing all commands in the previous command cache (292). Regardless of the state of the previous command cache, the current frame is fully rendered by executing all commands in the current command cache (294).

A Frame Flush partially executes the commands in the previous command cache and fully executes the commands in the current command cache. When a frame is "partially" rendered, all the commands in the command cache except for Clipped Drawing commands that update the current framebuffer are executed. However, since execution of Clipped Drawing commands that update the current framebuffer usually occupy 80 to 90 percent of the time required to render an average video frame, skipping the execution of those commands (except for any GP state/mode changes caused by those commands) significantly reduces rendering time, on average.

Figure 8B:
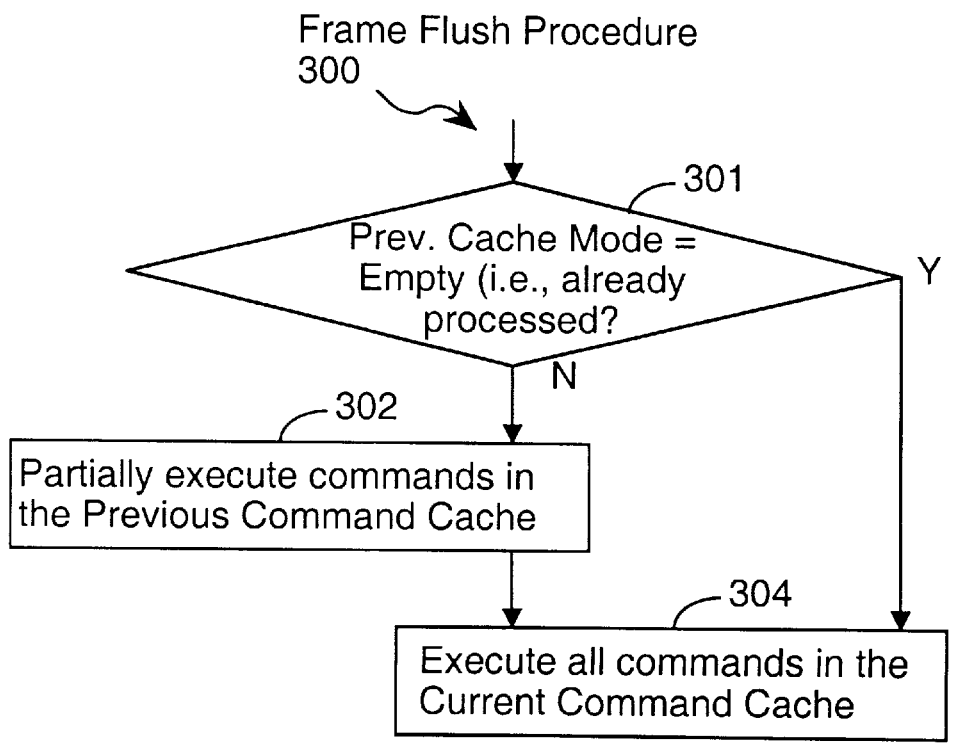

More specifically, referring to FIG. 8B, the Frame Flush procedure checks whether the Cache Mode from the previous command cache is Empty (indicating that the previous frame was fully or partially rendered and all commands in the previous command cache were fully or partially processed) (300). If not (300-N), the previous frame is partially rendered by executing some of the commands in the previous command cache (392). Regardless of the state of the previous command cache, the current frame is fully rendered by executing all commands in the current command cache (304). The partial render procedure is discussed below with reference to FIG. 10.

Figure 8C:
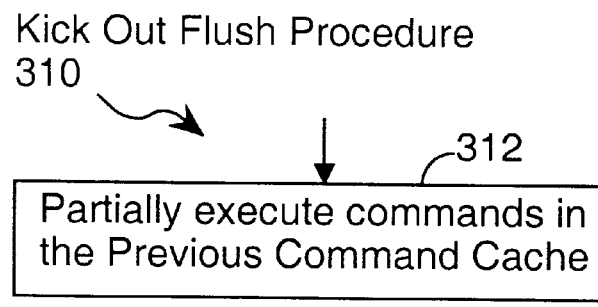

A Kick Out flush is used only when two or more successive frames have been skipped, which only happens when the emulation system has been unable to catch up to target system by skipping occasional single frames. Referring to FIG. 8C, the Kick Out flush procedure partially executes the commands in the previous command cache (310), and does not execute the commands in the current command cache at all.

Figure 8D:
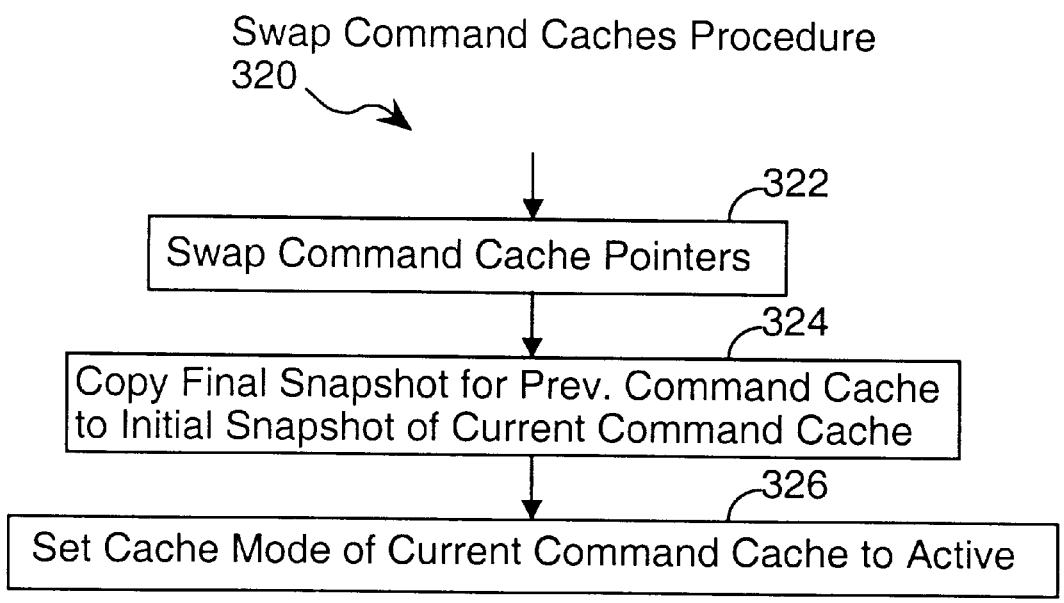
FIG. 8D depicts a flow chart of a Swap Command Cache procedure.

Referring to FIG. 8D, when the processing of a command cache is completed, room for the next frame's graphics commands is made by swapping command caches. More specifically, the swap command cache procedure 320 swaps the previous and current cache pointers (322), copies the final GP state snapshot for the previous command cache into the initial GP state snapshot of the current command cache (324), and sets the Cache Mode for the current command cache to Active (326). The Active mode indicates that graphics commands can be stored the current command cache as they are received from the main processor emulator.

Processing Commands in Command Cache

Figure 9:
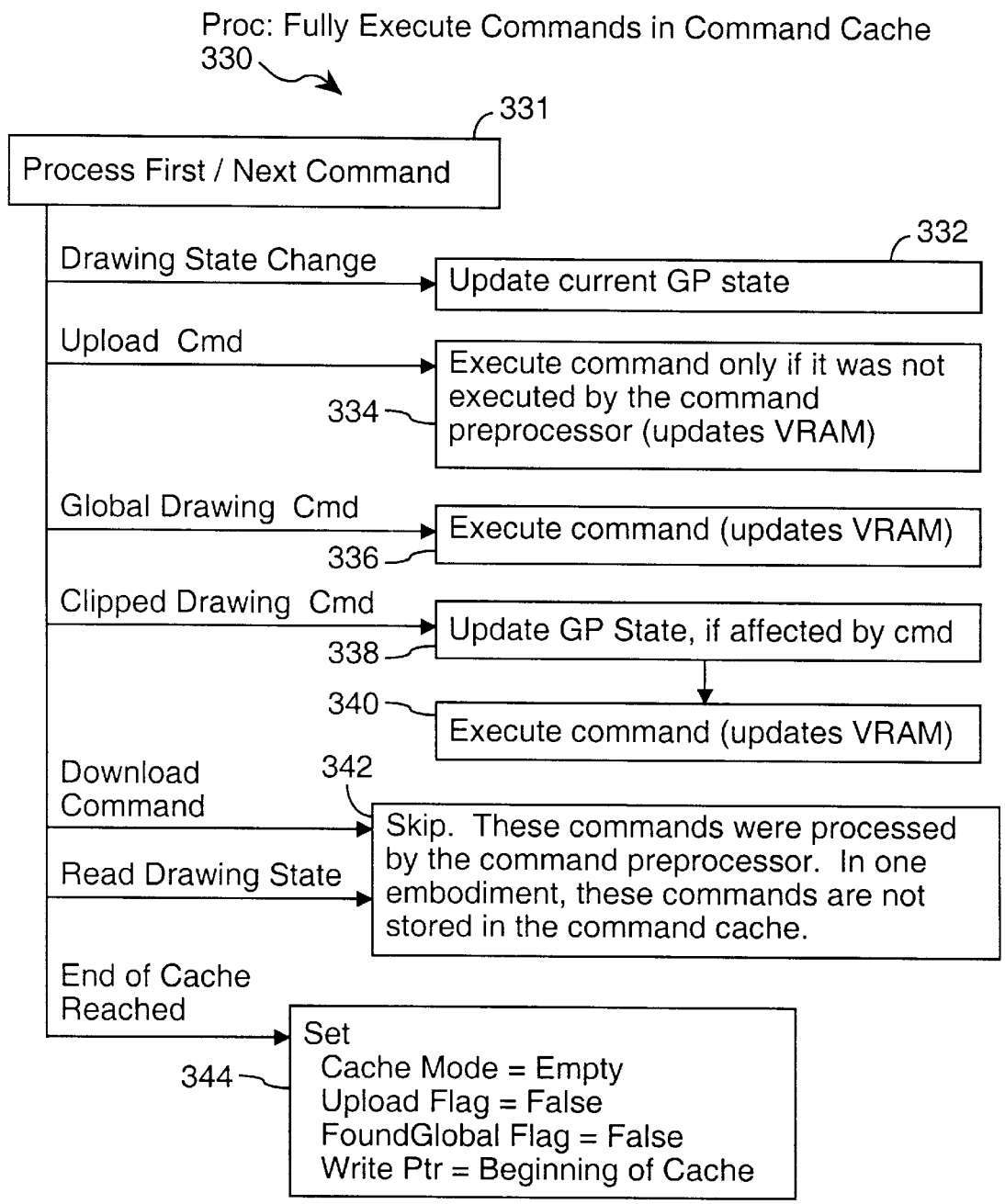
FIG. 9 depicts a flow chart of a procedure for fully executing (i.e., emulating) commands stored in one of the command caches.

Referring to FIG. 9, the procedure 330 for fully processing the commands in a command cache successively processes each of the graphics commands in the command cache, in the order they are stored therein (331). Drawing State Change commands are processed by updating the current GP State/Mode as specified by the command (332). Upload commands are processed by storing the image data specified by the command to a specified region of the VRAM (334). It is noted that Upload commands that were executed by the preprocessor are not stored in the command cache, and therefore are not executed by this procedure.

Global Drawing commands are processed by updating the VRAM contents in accordance with the command (336). Global Drawing commands are used to copy blocks of data from one portion of VRAM to another, and also to fill in a specified region of VRAM with a specified solid color.

Clipped Drawing commands are processed by rendering an object, such as a line, triangle or four sided object in VRAM, within the currently established clipping window (340). The clipping window is specified by the current GP State/Mode array. Some Clipped Drawing commands may modify the clipping window, in which case the clipping window is updated before the object specified by the command is rendered in VRAM (338).

Download commands and Read Drawing State commands are not stored in the command cache in a preferred embodiment, and therefore are not processed by the procedure 330 for fully processing the commands in a command cache (342).

When the end of the command cache is reached, the Cache Mode for the current command cache is set to Empty, to indicate that the commands in the cache have been fully processed, the Upload and FoundGlobal Flags are set to False, and the Write pointer is set to point to the beginning of the command cache (344). The latter steps prepare the command cache for storing the graphics commands for a new frame.

Figure 10A:
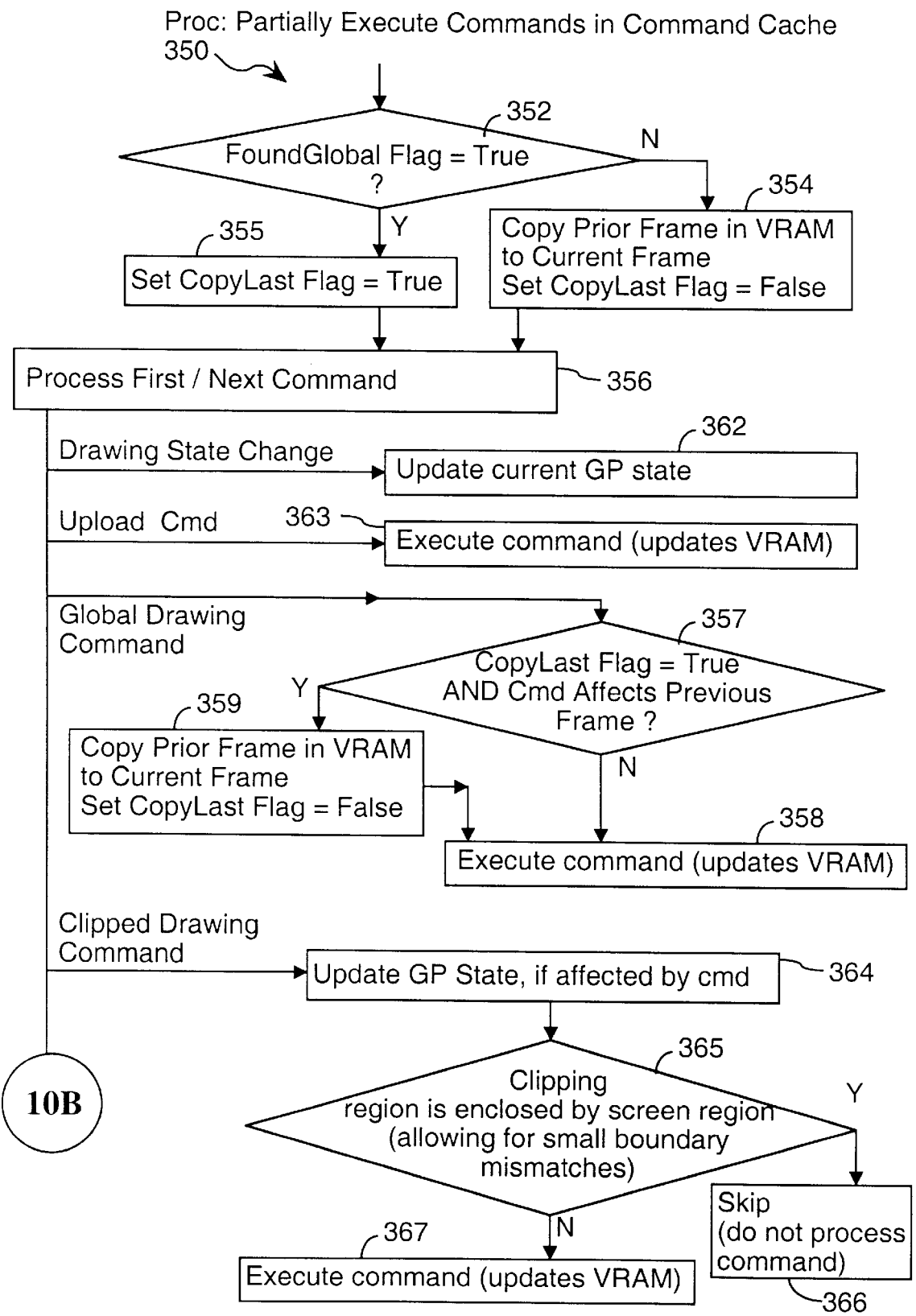
FIGS. 10A and 10B depict a flow chart of a procedure for partially executing (i.e., emulating) commands stored in one of the command caches.
Figure 10B:
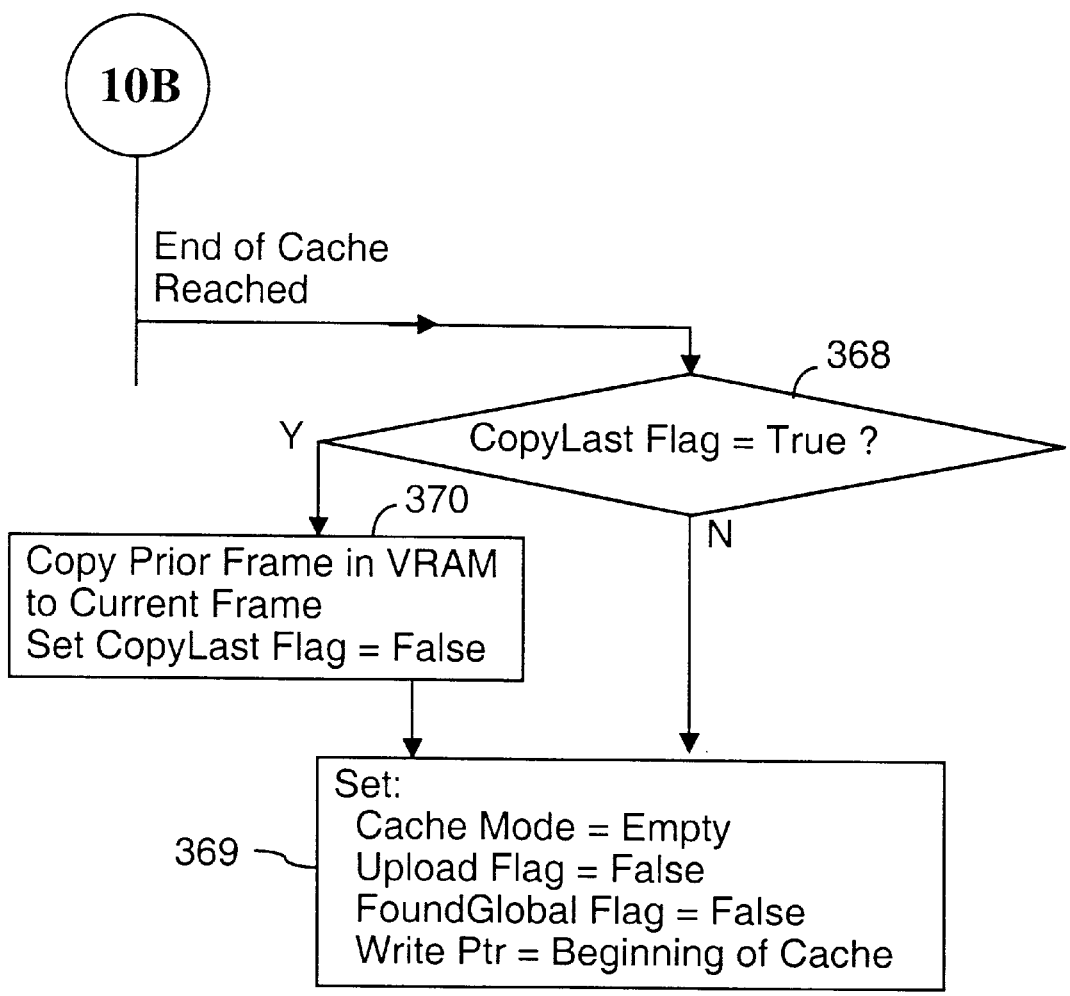

Referring to FIGS. 10A and 10B, the partial render procedure 350 operates on the assumption that when a frame is to be only partially rendered, a copy of the previous frame (i.e., the frame immediately prior to the one being partially rendered) is normally the best starting point for rendering the frame.

Another important assumption of the partial render procedure is that the image generated by the partial render procedure is never sent to the display. Thus, the most important commands in the command cache being processed are commands that modify the contents of VRAM outside the framebuffer for the command cache, since the contents of the VRAM outside that framebuffer may affect many subsequent images. (This is the reason that the only Clipped Drawing commands that are executed during partial rendering are those that may affect the VRAM outside the framebuffer for the previous command cache.) However, since the image stored in the framebuffer for the command cache may be used as the starting point for generating the subsequent frame, it is preferred to render that image as accurately as possible while minimizing the computational resources used to render the image.

The most difficult problem associated with partially rendering a frame is how to handle the Global Drawing commands. For example, if a frame that is to be partially rendered contains one or more global commands, those commands could overwrite the framebuffer for the frame being partially rendered. Global Drawing commands are sometimes used to overwrite a frame buffer with a solid color before other commands are used to generate the frame image. Therefore, when the command cache to be partially executed contains one or more Global Drawing commands, it is preferable to partially execute the commands in the command cache and to then copy the previous frame into the framebuffer for the frame being partially rendered.

However, it is possible for a Global Drawing command in a command cache to overwrite and thereby erase the previous frame. In that case, executing the global commands before copying the previous frame to the current framebuffer would defeat the purpose of copying the previous frame into the current framebuffer. To avoid this problem, when the command cache contains at least one Global Drawing command, the partial render procedure 350 sets a CopyLast flag to True to indicate that the previous frame is to be copied last. Further, as the commands in the command cache are executed, each Global Drawing command is checked to see if it would overwrite any portion of the previous frame and if it would, then the previous frame is copied to the current framebuffer before that Global Drawing command is executed and the CopyLast flag is cleared.

When the command cache for a frame contains no Global Drawing commands, it is best to copy the previous frame to the current framebuffer before executing any of the commands in the command cache. For instance, some video games "play movies" in a portion of the screen image by uploading data from main memory to VRAM for a sequence of frames. By copying the previous frame before executing these VRAM uploads, the VRAM uploads are given priority over the previous frame.

The partial render procedure 350 begins by checking to see if the FoundGlobal Flag is True (352). If not (352-N), there are no Global Drawing commands in the command cache being processed (herein called "the command cache" for convenience), and therefore the prior frame is copied to the framebuffer for the "current frame" (i.e., the framebuffer for the command cache whose commands are being processed by this procedure) and the CopyLast Flag is set to False (354). If the FoundGlobal Flag is True (352-Y), the CopyLast Flag is set to True (355) and the copying of the previous frame is delayed.

Next, the commands in the command cache are partially executed in the same order they were written into the cache (356).

Whenever the next command to be executed is a Global Drawing command, the procedure determines if the CopyLast Flag is set to True and also determines if the command would overwrite any portion of the framebuffer for the previous frame (357). The framebuffer for the previous frame is identified as the portion of VRAM identified by (A) the VRAM origin 172 (FIG. 5) in the initial snapshot 220 (FIG. 6) for the command cache being processed and (B) the Resolution 170 (FIG. 5) of the frame. If either or both of these conditions is not True (357-N), the Global Drawing command is simply executed (358). Otherwise, if both of these conditions are True (357-Y), the framebuffer for the prior frame is copied into the framebuffer for the current frame and the CopyLast Flag is reset to False (359) before the Global Drawing command is executed (358). The CopyLast Flag is reset to indicate that the prior frame has been copied into the framebuffer for the current frame.

Drawing State Change commands are processed by updating the current GP State/Mode as specified by the command (362). Upload commands are processed by storing the image data specified by the command to a specified region of the VRAM (363). It is noted that Upload commands that were executed by the preprocessor are not stored in the command cache, and therefore are not executed by this procedure.

Clipped Drawing commands are always executed to the extent that they update the Drawing Mode of the GP state (364). But the rendering aspect of Clipped Drawing commands is not performed if the clipping window is enclosed by the current frame's drawing region (i.e., the current framebuffer as specified by the Drawing Origin and Resolution for the current command cache) (365-Y, 366). In a preferred embodiment, the comparison of the clipping window and the current drawing region includes a small allowance (e.g., up to sixteen pixels in any direction) for mismatches between the drawing region and the clipping window. If the clipping window is not enclosed by the current frame's drawing region, the object specified by the Clipped Drawing command is rendered (367).

When the end of the command cache is reached, the CopyLast Flag is checked (368). If the CopyLast Flag is False (368-N), indicating that the previous frame has already been copied into the framebuffer for the current frame, then the command cache is cleared by setting the Cache Mode to Empty (to prevent the commands in the cache from being executed a second time), setting the Upload and FoundGlobal Flags to False, and setting the Write pointer to point to the beginning of the command cache (369). If the CopyLast Flag is False (368-Y), the prior frame is copied to the framebuffer for the current frame and the CopyLast Flag is set to False (370), and then the command cache is cleared (369) as described above.

In an alternate embodiment, when a frame is partially rendered, the previous frame is always copied into the framebuffer for the current frame prior to processing the commands in the command cache. In yet another embodiment, in addition to coping the prior frame into the framebuffer for the current frame prior to processing the commands in the command cache, the partial render procedure filters out and does not execute any Global Drawing commands that overwrite with a solid color only locations within the framebuffer for the current frame (with a small allowance for drawing location mismatches).

Processing a Frame when an End of Frame is Detected

Figure 11A:
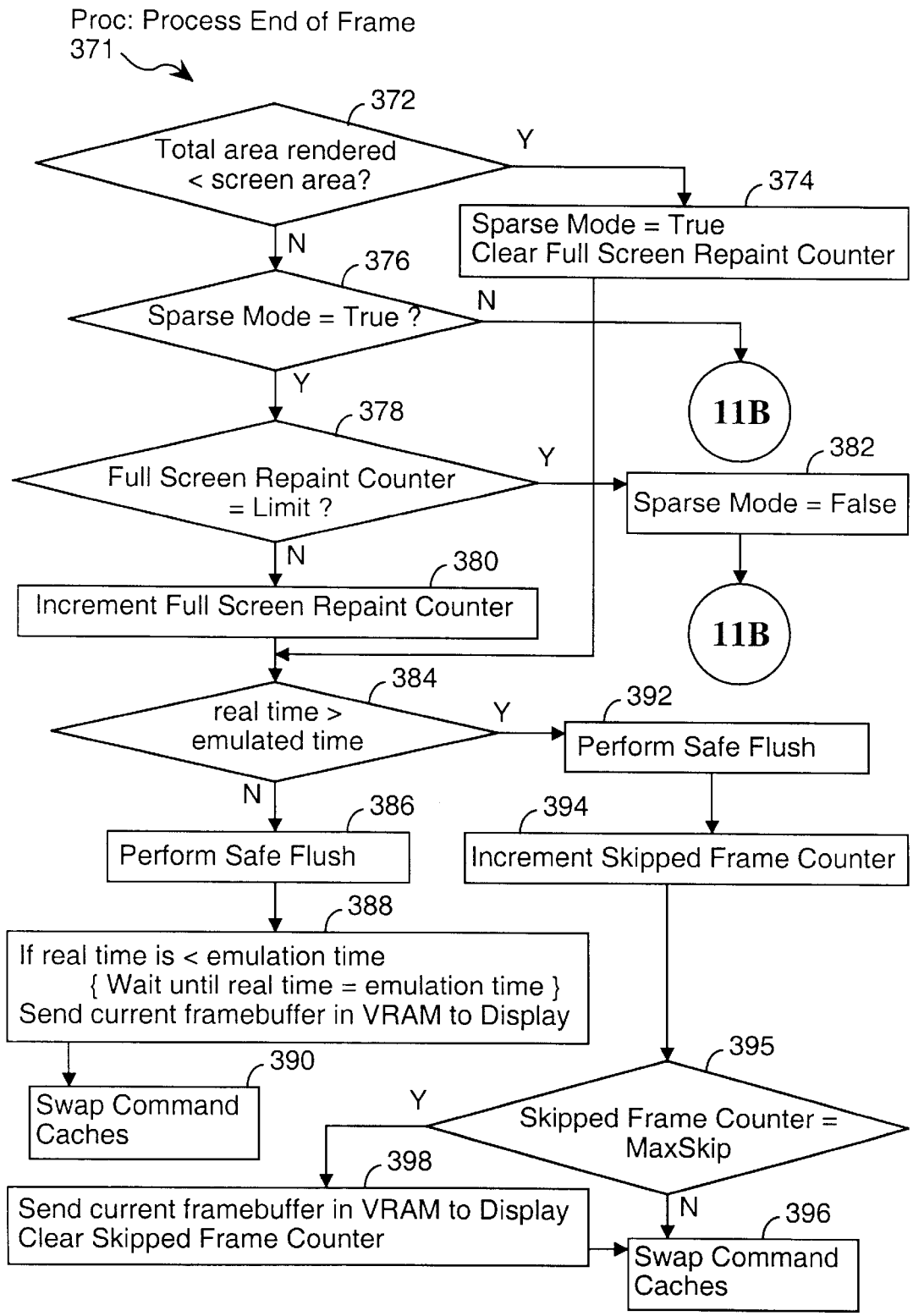
FIGS. 11A and 11B depict a flow chart of a procedure for processing the end of a video frame.
Figure 11B:
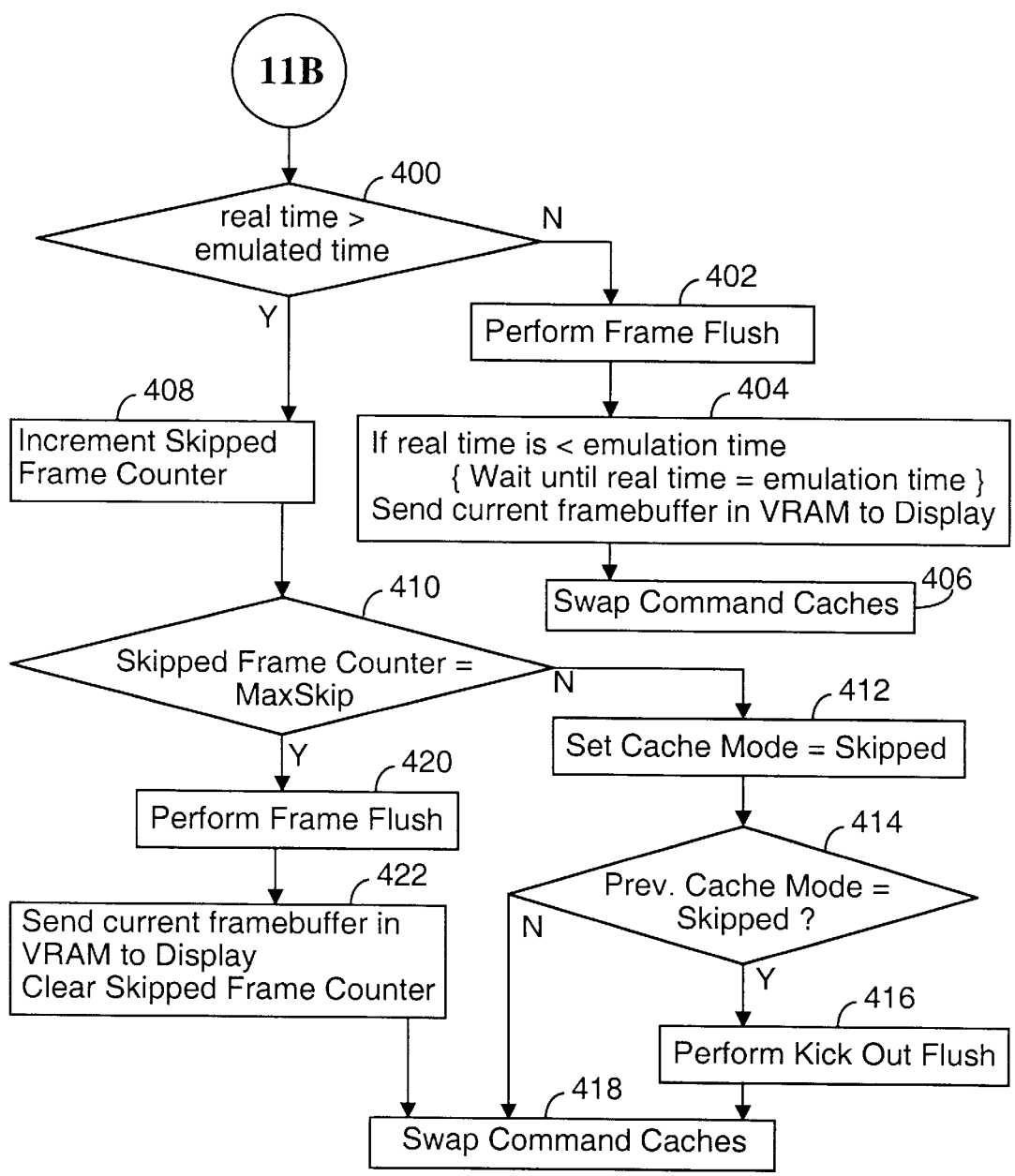

Referring to FIGS. 11A and 11B, when a frame end is detected by the preprocessor, the frame end processing procedure 371 is called. This procedure 371 is executed by the graphics processor emulator 158 shown in FIGS. 4. The initial steps of the procedure 371 are used to determine if the emulator is in Sparse Mode of Full Mode. In Sparse Mode the previous and current frames are always fully rendered, but displaying the current frame may be skipped if the emulator is running behind the target computer system. In Full Mode, processing of the current frame is skipped if the emulator is running behind the target computer system. However, special provisions are made when two or more successive frames are skipped so as to partially render those frames and furthermore to fully render and display at least one in every five or so frames.

If the Total Area rendered by the global and clipped commands for the current frame is less than the screen area (i.e., the size of the framebuffer for each frame) (372), the Sparse Mode flag is set to True and the Full Screen Repaint Counter is cleared (374). Otherwise (372-N), if the emulator is currently in Sparse Mode (376) and the Full Screen Repaint Counter is not at its Limit value (378), the Full Screen Repaint Counter is incremented (380) and the emulator remains in Sparse Mode. Whenever the emulator is set to Sparse Mode or remains in Sparse Mode, processing of the frame continues at step 384 (discussed below).

On the other hand, if the emulator is in Full Mode (indicated by the Sparse Mode flag being set to False) (376-N), or the Full Screen Repaint Counter is at its limit value (378-Y) and the emulator is set to Full Mode (Sparse Mode flag=False) (382), the processing of the frame continues at step 400 (FIG. 11B).

At step 384, the emulator determines if it is falling behind the target computer system (i.e., if it has been generating frames slower than the target computer system). This is determined by comparing the "real time" value of the computer on which the emulator is being executed with the emulation time generated by the main processor emulator. If the emulator is not falling behind (384-N), a Safe Flush (procedure 290, FIG. 8A) is performed (386). Then the emulator waits until the emulator's real time is synchronized with emulation time for the target computer system before sending the current framebuffer to the display (388) so that it can be viewed by the user. Finally, the command caches are swapped (390) That is, the command cache swap procedure 320 is called, as discussed above with reference to FIG. 8D.

If the emulator is in Sparse Mode but is falling behind (384-Y) the target computer system, a Safe Flush (procedure 290, FIG. 8A) is performed (392) anyway, but the current frame may not displayed. The Skipped Frame Counter is incremented (394) and compared with a MaxSkip value (395). A typical value for MaxSkip is five, but in alternate embodiments it could be set anywhere from three to eight. If the Skipped Frame Counter is not equal to MaxSkip (395-N), the command caches are swapped (396), but the current frame is not displayed. If the Skipped Frame Counter is equal to MaxSkip (395-Y), the current frame buffer is sent to the display and the Skipped Frame Counter is cleared (398). In addition, the command caches are swapped (396).

Referring to FIG. 11B, if the emulator is in Full Mode, the emulator determines if it is falling behind the target computer system by comparing the "real time" value of the computer on which the emulator is being executed with the emulation time generated by the main processor emulator (400). If the emulator is not falling behind (400-N), a Frame Flush (procedure 300, FIG. 8B) is performed (402). Then the emulator waits until the emulator's real time is synchronized with emulation time for the target computer system before sending the current framebuffer to the display (404) so that it can be viewed by the user. Finally, the command caches are swapped (406) by calling the command cache swap procedure 320 (FIG. 8D).

If the emulator is in Full Mode and is falling behind (400-Y) the target computer system, the Skipped Frame Counter is incremented (408) and compared with the Max- Skip value (410). If the Skipped Frame Counter is not equal to MaxSkip (410-N), the Cache Mode for the current command cache is set to Skipped (412) to indicate that it has not been processed. If the Cache Mode for the previous command cache is also Skipped (414-Y), a Kick Out Flush is performed (416) so as to partially render the previous frame, and then the command caches are swapped to prepare for receiving the graphics commands for the next frame (418). If the Cache Mode for the previous command cache is not equal to Skipped (414-N), the command caches are swapped (418).

If the Skipped Frame Counter is equal to MaxSkip (410-N), a Frame Flush is performed (420) so as to partially render the previous frame (if it has not been previously rendered) and to fully render the current frame. The current framebuffer is then sent to the display, the Skipped Frame Counter is cleared (422), and the command caches are swapped (418).

Alternate Embodiments

The present invention can be implemented as a computer program product that includes a computer program mechanism embedded in a computer readable storage medium. For instance, the computer program product could contain the emulation module 102 shown in FIG. 3, or equivalently the program modules forming the graphics system emulator 150 shown in FIG. 4. The emulation module or modules may be stored on a CD-ROM, magnetic disk storage product, or any other computer readable data or program storage product. The software modules in the computer program product may also be distributed electronically, via the Internet or otherwise, by transmission of a computer data signal (in which the software module or modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of emulating operation of a graphics processor in a target computer system, the emulation being performed by a general purpose computer, the method comprising steps of:

receiving a sequence of graphics commands;

storing the graphics commands in a command cache; and upon detecting a frame end, executing at least some of the commands in the command cache so as to at least partially render a frame represented by the commands in the command cache and thereby store image data in a video memory (VRAM);

the executing step including, evaluating the ability of the general purpose computer to generate video frames fully synchronized with the target computer system;

when the evaluation is positive, fully executing all the commands in the command cache so as to fully render the frame; and when the evaluation is negative, executing a first subset of the commands in the command cache, and skipping execution of a second subset of the commands in the command cache, so as to partially render the frame.

2. The emulation method of claim 1, wherein the evaluation step is repeated each time a frame end is detected, the successive evaluation steps generating a different evaluations so that some frames are fully rendered while other frames are partially rendered.

3. The emulation method of claim 1, wherein the evaluation step includes comparing a current time value with an emulation time value to determine if the emulation is generating frames more slowly than the target computer system.

4. The emulation method of claim 1, wherein:

the commands stored in the command cache include drawing commands for drawing objects in the VRAM;

the evaluation step includes determining whether a total rendering area associated with all drawing commands for each frame exceeds an image area associated with each frame;

when the determination is that the total rendering area does not exceed the image area, selecting a first mode of operation;

when the determination for at least N successive frames is that the total rendering area does exceed the image area, selecting a second mode of operation, where N is an integer greater than two;

when the first mode of operation is selected, full rendering all frames; and when the second mode of operation is selected, comparing a current time value with an emulation time value to determine if the emulation is generating video frames more slowly than the target computer system, fully rendering a frame when the comparison has a first result, and partially rendering the frame when the comparison has a second result distinct from the first result.

5. A computer program product, for use in conjunction with a general purpose computer system, the computer program product comprising a computer readable storage medium and a computer program mechanism embedded therein, the computer program mechanism comprising:

a preprocessor module and a graphics processor emulator module, the graphics processor module being configured for emulating operation of a graphics processor in a target computer system;

the preprocessor module including:

instructions for receiving a sequence of graphics commands, and for storing the graphics commands in a command cache; and instructions for detecting a frame end and upon detecting a frame end, invoking execution of the graphics processor emulator module;

the graphics processor emulator module including:

instructions for executing at least some of the commands in the command cache so as to at least partially render a frame represented by the commands in the command cache and thereby store image data in a video memory (VRAM);

the executing instructions including, instructions for evaluating the ability of the general purpose computer to generate video frames fully synchronized with the target computer system;

instructions, enabled when the evaluation is positive, for fully executing all the commands in the command cache so as to fully render the frame; and instructions, enabled when the evaluation is negative, for executing a first subset of the commands in the command cache, and skipping execution of a second subset of the commands in the command cache, so as to partially render the frame.

6. The computer program product of claim 5, wherein the invoking instructions in the preprocessor module invoke the graphics processor emulator module each time a frame end is detected, the successive invocations generating different evaluations so that some frames are fully rendered while other frames are partially rendered.

7. The computer program product of claim 5, wherein the evaluation instructions include instructions for comparing a current time value with an emulation time value to determine if the general purpose computer system is generating frames more slowly than the target computer system.

8. The computer program product of claim 5, wherein:
the commands stored in the command cache include drawing commands for drawing objects in the VRAM;
the evaluation instructions include
instructions for determining whether a total rendering area associated with all drawing commands for each frame exceeds an image area associated with each frame;
instructions, enabled when the determination is that the total rendering area does not exceed the image area, for selecting a first mode of operation;
instructions, enabled when the determination for at least N successive frames is that the total rendering area does exceed the image area, for selecting a second mode of operation, where N is an integer greater than two;
instructions, enabled when the first mode of operation is selected, for full rendering all frames; and
instructions, enabled when the second mode of operation is selected, for comparing a current time value with an emulation time value to determine if the emulation is generating video frames more slowly than the target computer system, fully rendering a frame when the comparison has a first result, and partially rendering the frame when the comparison has a second result distinct from the first result.

9. A computer data signal embodied in a carrier wave, comprising:
a preprocessor module and a graphics processor emulator module, the graphics processor module being configured for execution by a general purpose computer system and for emulating operation of a graphics processor in a target computer system;
the preprocessor module including:
instructions for receiving a sequence of graphics commands, and for storing the graphics commands in a command cache; and
instructions for detecting a frame end and upon detecting a frame end, invoking execution of the graphics processor emulator module;
the graphics processor emulator module including:
instructions for executing at least some of the commands in the command cache so as to at least partially render a frame represented by the commands in the command cache and thereby store image data in a video memory (VRAM);
the executing instructions including,
instructions for evaluating the ability of the general purpose computer to generate video frames fully synchronized with the target computer system;
instructions, enabled when the evaluation is positive, for fully executing all the commands in the command cache so as to fully render the frame; and
instructions, enabled when the evaluation is negative, for executing a first subset of the commands in the command cache, and skipping execution of a second subset of the commands in the command cache, so as to partially render the frame.

10. The computer data signal of claim 9, wherein the invoking instructions in the preprocessor module invoke the graphics processor emulator module each time a frame end is detected, the successive invocations generating different evaluations so that some frames are fully rendered while other frames are partially rendered.

11. The computer data signal of claim 9, wherein the evaluation instructions include instructions for comparing a current time value with an emulation time value to determine if the general purpose computer system is generating frames more slowly than the target computer system.

12. The computer data signal of claim 9, wherein:
the commands stored in the command cache include drawing commands for drawing objects in the VRAM;
the evaluation instructions include
instructions for determining whether a total rendering area associated with all drawing commands for each frame exceeds an image area associated with each frame;
instructions, enabled when the determination is that the total rendering area does not exceed the image area, for selecting a first mode of operation;
instructions, enabled when the determination for at least N successive frames is that the total rendering area does exceed the image area, for selecting a second mode of operation, where N is an integer greater than two;
instructions, enabled when the first mode of operation is selected, for full rendering all frames; and
instructions, enabled when the second mode of operation is selected, for comparing a current time value with an emulation time value to determine if the emulation is generating video frames more slowly than the target computer system, fully rendering a frame when the comparison has a first result, and partially rendering the frame when the comparison has a second result distinct from the first result.

* * * * *